Aug. 20, 1935.　　　E. G. BODEN　　　2,011,559
LUBRICATING DEVICE
Filed Feb. 8, 1935　　　2 Sheets-Sheet 1
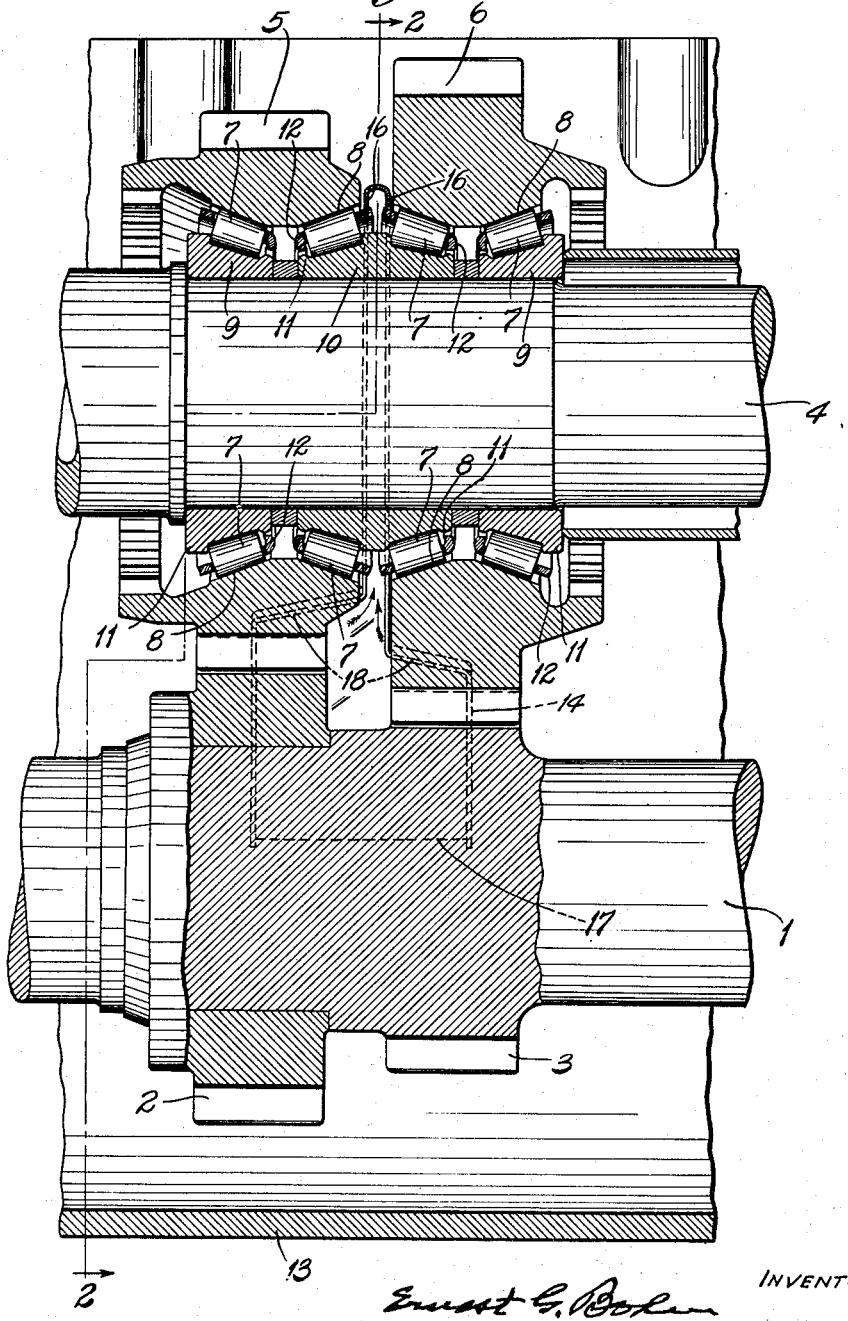
INVENTOR:
HIS ATTORNEYS.

Aug. 20, 1935.   E. G. BODEN   2,011,559
LUBRICATING DEVICE
Filed Feb. 8, 1935   2 Sheets-Sheet 2
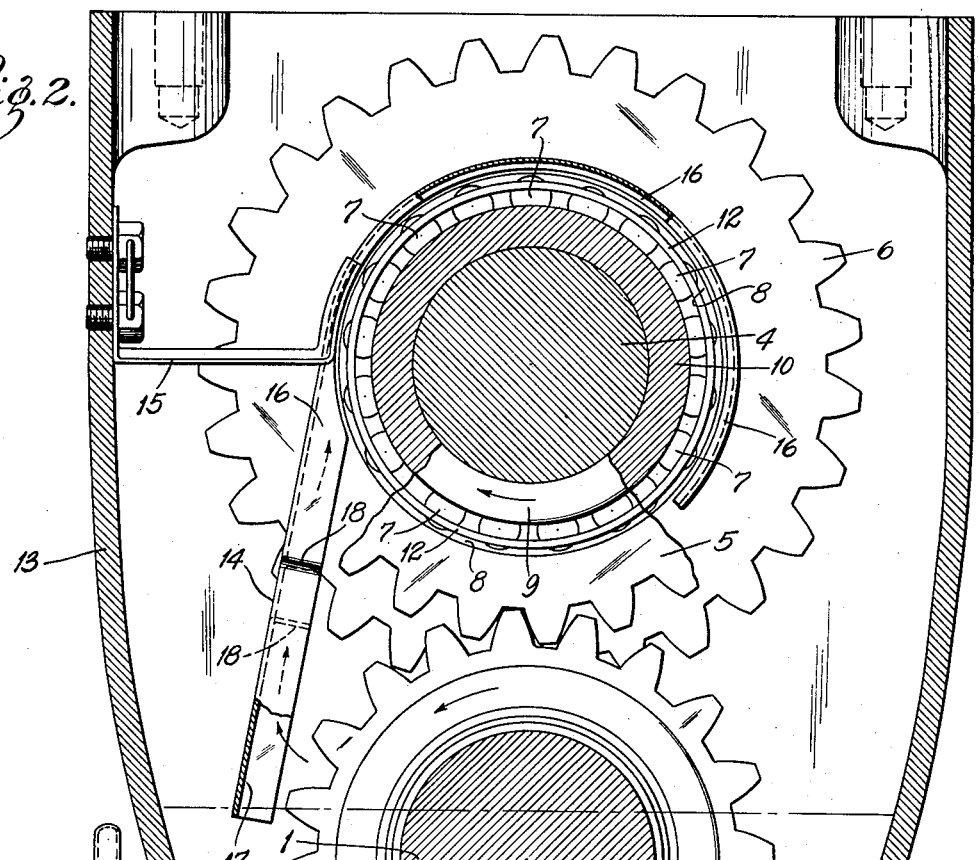
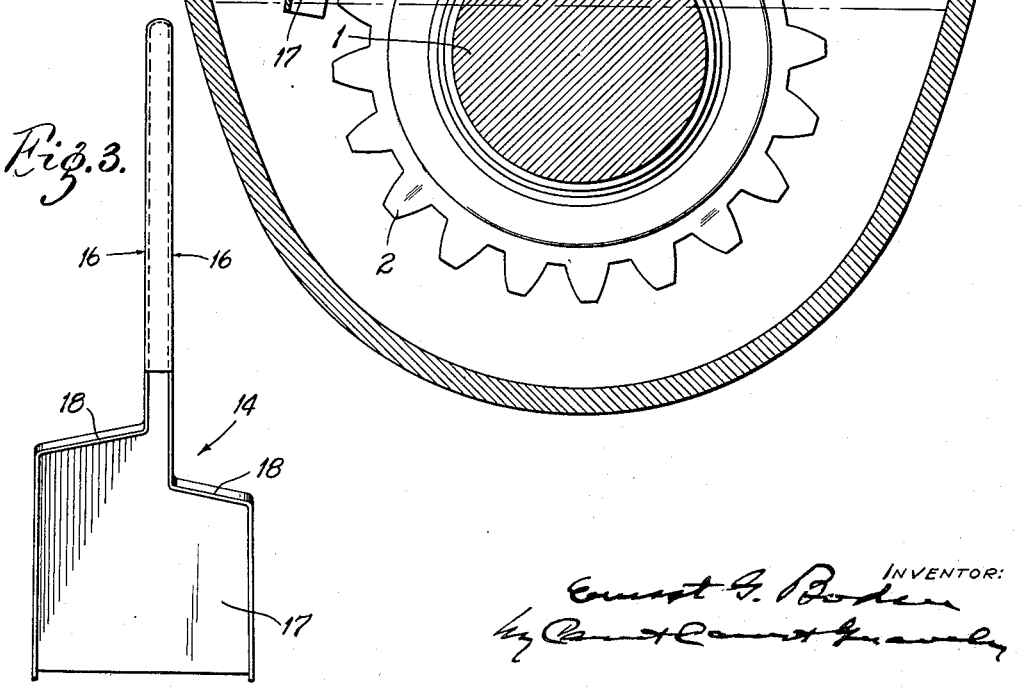
INVENTOR:
Ernest G. Boden
HIS ATTORNEYS.

Patented Aug. 20, 1935

2,011,559

UNITED STATES PATENT OFFICE 2,011,559

LUBRICATING DEVICE

Ernest G. Boden, Canton, Ohio, assignor to The Timken Roller Bearing Company, Canton, Ohio, a corporation of Ohio Application February 8, 1935, Serial No. 5,519

6 Claims. (Cl. 184—13)

This invention relates to gearing of the kind wherein idle gears are mounted on antifriction bearings, especially where the idle gears mesh with fast gears that run in oil. The principal object of the invention is to devise means for assuring an adequate supply of lubricant for the bearings, especially where the bearings are taper roller bearings with their large ends on the oil inlet side. The invention consists in the combinations and arrangements of parts hereinafter described and claimed.

In the accompanying drawings, wherein like numerals refer to like parts wherever they occur, Fig. 1 is a vertical view, partly in cross-section and partly in elevation, of the lower part of a well-known type of transmission gearing and the housing therefor, showing my device applied thereto;

Fig. 2 is a vertical view, partly in cross-section and partly in elevation, of the construction illustrated on the line 2—2 in Fig. 1, and Fig. 3 is a detail view in elevation of the lubricating device.

The transmission gearing, partially illustrated in Fig. 1, comprises a horizontally disposed shaft 1 that is provided with spur pinions 2, 3 of different diameters integral therewith or fixed thereon. A second horizontal shaft 4 is located above the first mentioned shaft and is provided with roller bearings opposite said pinions respectively; and on these roller bearings are pinions 5, 6 which mesh respectively with the pinions of the lower shaft and also with gears that are not part of this invention and are not shown in the drawings.

In the arrangement shown in the drawings, there are two rows of taper rollers 7 for each of the idle pinions arranged with the small ends of the rollers facing each other. The outer raceways 8 for the bearings are formed integral with the idle pinions, which are made in the form of rings with their inner or raceway surfaces tapering toward each other. The inner raceway members 9, 10 of the bearings are rings with conical raceway surfaces. The two endmost inner raceway members or cones 9 have a single conical raceway each. Preferably the two intermediate inner raceway members 10 are made integral in the form of two cones arranged base to base or with a narrow cylindrical portion between their conical raceway surfaces. In the design of roller bearing illustrated in the drawings, the inner bearing members 9, 10 are provided with the usual thrust ribs 11 and each row of rollers is provided with a suitable spacing cage 12.

The gearing above described is enclosed in a housing or casing 13 adapted to constitute an oil receptacle. In service, the oil in the casing is preferably at or above the axis of the lower shaft. By this arrangement, oil is carried by the lower pinions to the upper pinions in ample quantity for thorough lubrication of the pinion teeth. Some oil flows from the gear teeth of the idle pinions radially towards the ends of the bearings thereof but, as the outer ends of the raceway members are of larger diameter than the inner ends thereof, centrifugal action retards or prevents the flow of oil longitudinally of the bearings with the result that the bodies of the rollers are liable to be inadequately lubricated unless otherwise provided for.

According to the present invention, an oil guide member 14 is mounted on a bracket 15 or other suitable support secured to the main housing 13. The upper portion of this oil guide member is narrow enough to enter the space between the two idle gears without touching either of them. Its upper part is bent into a circular arc close to but clear of the cages of the adjacent bearings throughout a long arc, say upwards, of 180 degrees. At one end of this arc, the oil guide member is extended tangentially downwardly, preferably to or below the normal level of the oil in the casing, and at such inclination as to clear the lower pinions. The lowermost portion 17 of the oil guide member is widened out on both sides beyond the near or inner ends of the lower pinions to form a pan. The drawings show the upper part of the oil guide as being concave or channel shape having sides 16. As indicated, the upper edges of the widened portions are preferably inclined upwardly toward the channel and provided with flanges 18 which are, in effect, continuations of the sides of said channel.

By this arrangement, oil is carried up in the tooth spaces of the lower pinions and delivered partly by centrifugal action and partly by the pumping action of the gears onto the receiving pan 17. As the pumping and centrifugal action of the gears continue, oil is forced upwardly from said pan along the arcuate portion of the guide, from whence it passes into the adjacent bearings. The force of the oncoming oil is sufficient to cause the oil to flow through the bearings into the spaces between the pairs of rollers of each bearing, from whence it will flow through the outermost portions of the bearings by the action of the outermost rollers themselves.

What I claim is:

1. The combination of a lower shaft having gears fixed thereon close to each other, an upper shaft parallel therewith and having loose gears thereon meshing with said fixed gears, taper roller bearings between said loose gears and the upper shaft, a gear casing for said gears constituting an oil container, and a lubricant guide member extending upwardly from the oil container to and over the bearings, the lower portion of said guide member being wide enough to extend beyond the near ends of the fixed gears and having its side close to said gears, and the upper portion of said guide member being of arcuate form and located between the loose gears slightly beyond the bearings.

2. The combination of a lower shaft having gears fixed thereon close to each other, an upper shaft parallel therewith and having loose gears thereon meshing with said fixed gears, taper roller bearings between said loose gears and the upper shaft, a gear casing for said gears constituting an oil container and a lubricating guide member extending upwardly from the oil container to and over the bearings, the rollers at adjacent ends of the loose gears being disposed with their large ends towards each other, the lower portion of said guide member being wide enough to extend beyond the near ends of the fixed gears and having its sides close to said gears and the upper portion of said guide member being of arcuate form and located between the loose gears slightly beyond the bearings.

3. The combination of a lower shaft having gears fixed thereon close to each other, an upper shaft parallel therewith, loose gears meshing with said fixed gears, taper roller bearings between said loose gears and the upper shaft, said bearings comprising two rows of taper rollers for each loose gear arranged with their small ends toward each other, a gear casing for said gears constituting an oil container and a lubricating guide member extending upwardly from the oil container to and over the bearings, the lower portion of said channel member being wide enough to extend beyond the near ends of the fixed gears and having its side close to said gears, and the upper portion of said guide member being of arcuate form and located between the loose gears slightly beyond the bearings.

4. The combination of a lower shaft having gears fixed thereon close to each other, an upper shaft parallel therewith, loose gears meshing with said fixed gears, taper roller bearings between said loose gears and the upper shaft, said bearings comprising two rows of taper rollers for each loose gear arranged with their small ends toward each other, one inner raceway member of the bearing of one loose gear being integral with one inner raceway of the adjacent loose gear, a gear casing for said gears constituting an oil container and a lubricating guide member extending upwardly from the oil container to and over the bearings, the lower portion of said guide member being wide enough to extend beyond the near ends of the fixed gears and having its side close to said gears, and the upper portion of said guide member being of arcuate form and located between the loose gears slightly beyond the bearings.

5. The combination of a lower shaft having gears fixed thereon close to each other, an upper shaft parallel therewith and having loose gears thereon meshing with said fixed gears, taper roller bearings between said loose gears and the upper shaft, a gear casing for said gears constituting an oil container and a lubricant channel member extending upwardly from the oil container to and over the bearings, the lower portion of said channel member being wide enough to extend beyond the near ends of the fixed gears and having its side close to said gears, and the upper portion of said channel member being of arcuate form and located between the loose gears slightly beyond the bearings with its open side inward.

6. The combination of a lower shaft having gears fixed thereon close to each other, an upper shaft parallel therewith and having loose gears thereon meshing with said fixed gears, taper roller bearings between said loose gears and the upper shaft, a gear casing for said gears constituting an oil container and a lubricating channel member extending upwardly from the oil container to and over the bearings, the rollers at adjacent ends of the loose gears being disposed with their large ends towards each other, the lower portion of said channel member being wide enough to extend beyond the near ends of the fixed gears and having its sides close to said gears and the upper portion of said channel member being of arcuate form and located between the loose gears slightly beyond the bearings with its open side inward.

ERNEST G. BODEN.